(12) United States Patent
Zheng

(10) Patent No.: US 10,637,577 B2
(45) Date of Patent: Apr. 28, 2020

(54) OPTICAL MODULE

(71) Applicant: Hisense Broadband Multimedia Technologies Co., Ltd., Qingdao, Shandong (CN)

(72) Inventor: Long Zheng, Shandong (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 0 days.

(21) Appl. No.: 16/503,274

(22) Filed: Jul. 3, 2019

(65) Prior Publication Data

US 2019/0326993 A1    Oct. 24, 2019

Related U.S. Application Data

(63) Continuation of application No. PCT/CN2019/080464, filed on Mar. 29, 2019.

(30) Foreign Application Priority Data

Mar. 29, 2018  (CN) .......................... 2018 1 0268535
May 9, 2018    (CN) .......................... 2018 1 0439060
(Continued)

(51) Int. Cl.
*H04B 10/40*    (2013.01)
*H04Q 11/00*    (2006.01)
(Continued)

(52) U.S. Cl.
CPC .......... *H04B 10/40* (2013.01); *G02B 6/4274* (2013.01); *H04B 10/50* (2013.01); *H04Q 11/0005* (2013.01)

(58) Field of Classification Search
CPC ...... H04B 10/40; H04B 10/50; G02B 6/4274; H04Q 11/0005
See application file for complete search history.

(56) References Cited

U.S. PATENT DOCUMENTS 9,999,130 B2 *  6/2018  Zhao .................. H05K 1/18
10,320,180 B1 * 6/2019  Venigalla ........... H01R 13/6666
(Continued)

FOREIGN PATENT DOCUMENTS

CN    201336661 Y    10/2009
CN    202488463 U    10/2012
(Continued)

OTHER PUBLICATIONS

ISA State Intellectual Property Office of the People's Republic of China, International Search Report Issued in Application No. PCT/CN2019/080464, dated Jul. 1, 2019, WIPO, 4 pages.

*Primary Examiner* — Mina M Shalaby
(74) *Attorney, Agent, or Firm* — Hauptman Ham, LLP

(57) ABSTRACT

An optical module includes a gold finger, a comparing unit and a voltage dividing unit. The gold finger includes a plurality of pins. A first pin of the plurality of pins is capable of being multiplexed. The comparing unit includes a first input, a second input and a first output. The first input is connected with the first pin. The second input is configured to receive a reference voltage. The first output is configured to output an output voltage. The voltage dividing unit includes a third input and a second output. The third input is configured to receive a voltage input. The second output is connected with the first pin and configured to regulate a voltage on the first pin, so that the first input of the comparing unit receives a regulated voltage. Voltages of different levels are output by the comparing unit based on a comparison result between an input voltage of the first input of the comparing unit and the reference voltage of the second input.

12 Claims, 3 Drawing Sheets

(30) Foreign Application Priority Data

Jun. 19, 2018 (CN) .......................... 2018 1 0631480
Jun. 20, 2018 (CN) .......................... 2018 1 0637538

(51) Int. Cl.
*G02B 6/42* (2006.01)
*H04B 10/50* (2013.01)

(56) References Cited

U.S. PATENT DOCUMENTS

| | | | |
|---|---|---|---|
| 2017/0023750 A1* | 1/2017 | Xu | G02B 6/43 |
| 2017/0331270 A1* | 11/2017 | Mattos | H02H 3/087 |
| 2017/0338896 A1* | 11/2017 | Zhang | G02B 6/428 |
| 2018/0180828 A1* | 6/2018 | Zhao | G02B 6/4277 |
| 2018/0278329 A1* | 9/2018 | Chou | H04B 10/2503 |
| 2018/0314282 A1* | 11/2018 | Tan | G05F 1/565 |
| 2019/0041008 A1* | 2/2019 | Xiong | H05B 45/00 |
| 2019/0079477 A1* | 3/2019 | Sanio | B60K 17/28 |
| 2019/0324483 A1* | 10/2019 | Tan | G05F 3/20 |
| 2020/0049873 A1* | 2/2020 | Zheng | G02B 6/0005 |

FOREIGN PATENT DOCUMENTS

| | | |
|---|---|---|
| CN | 107104735 A | 8/2017 |
| CN | 108736977 A | 11/2018 |
| CN | 108880685 A | 11/2018 |

* cited by examiner

OPTICAL MODULE

CROSS REFERENCE TO RELATED APPLICATIONS

This application is a continuation application of International Application No. PCT/CN2019/080464 filed on Mar. 29, 2019, which claims priority to Chinese Patent Application No. 2018102685355 entitled "OPTICAL MODULE" filed on Mar. 29, 2018, Chinese Patent Application No. 2018104390601 entitled "OPTICAL MODULE" filed on May 9, 2018, Chinese Patent Application No. 201810631480X entitled "OPTICAL MODULE" filed on Jun. 19, 2018, and Chinese Patent Application No. 2018106375381 entitled "OPTICAL MODULE" filed on Jun. 20, 2018, the entire contents of which are incorporated herein by reference.

TECHNICAL FIELD

The present disclosure relates to communication technology and in particular to an optical module.

BACKGROUND

With an increasing communication rate of an optical module, transmission channels are increased. As a result, the number of gold fingers is necessary to be increased for signal transmission between the optical module and a host. It is desired to insert more optical modules in a standard machine frame. However, due to size requirements of the standard machine frame and the host, the size of the optical module cannot be made excessively large, which limits the number of pins of the gold fingers arranged on the optical module and limits the number of different control levels transmitted via the gold fingers as well. As a result, working modes are restricted and use function of the optical modules is limited. There is a need to solve the technical problem that different control voltages cannot be output due to the limited number of the pins of the gold fingers to drive the optical module to enable different working modes in the optical module.

SUMMARY

The optical module provided in the present disclosure includes a gold finger, a comparing unit and a voltage dividing unit. The gold finger includes a plurality of pins, one of which is a first pin. The comparing unit includes a first input, a second input and a first output. The first input is connected with the first pin, the second input is configured with a determination reference voltage, and the first output is configured with an output voltage. The voltage dividing unit includes a third input and a second output. The third input is configured to receive a voltage input. The second output is connected with the first pin and configured to regulate a voltage at the first pin, so that the first input of the comparing unit obtains an input voltage. Output voltages with different levels are obtained based on a comparison result between the input voltage of the first input of the comparing unit and the determination reference voltage of the second input.

One of ordinary skill in the art would understand that the above general descriptions and the subsequent detailed descriptions are merely illustrative and explanatory and shall not constitute limitation to the scope of the present disclosure.

BRIEF DESCRIPTION OF THE DRAWINGS

To describe the embodiments of the present disclosure more clearly, accompanying drawings for the examples of the present disclosure will be briefly described below. It is apparent that those with ordinary skill in the art may also obtain other drawings based on these drawings without paying creative work.

DETAILED DESCRIPTION OF THE EMBODIMENTS

Figure 1:
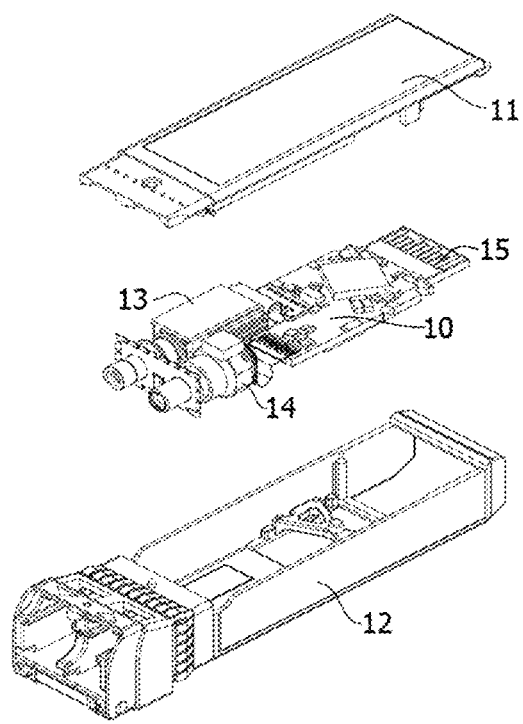
FIG. 1 is a schematic diagram of a structure of an optical module according to some embodiments of the present disclosure.

Exemplary embodiments will be described in detail herein with the examples illustrated in the drawings. When the following descriptions involve the drawings, like numerals in different drawings represent like or similar elements unless stated otherwise. The embodiments described in the following examples do not represent all embodiments consistent with the present disclosure. On the contrary, they are embodiments of an apparatus and a method consistent with some aspects of the present disclosure described in detail in the appended claims.

An optical module is inserted into a device machine (a host) during use. The optical module establishes electrical connection with the host through a gold finger on a circuit board to perform electrical communications such as power supply, data transmission and so on. The optical module is often manufactured by an optical module manufacturer, the host is often manufactured by a host manufacturer and a part for connecting the optical module, and the host is often manufactured based on a unified standard. Specifically, the number and the definition of pins connected with the gold finger of the optical module is consistent to facilitate connection with interfaces of the host. Although these standards are helpful for establishing electrical connection between the optical module and the host, the number and the functions of the pins of the gold finger are limited, which in turn imposes a negative effect on the research and development of the optical module manufacturer for optical module functions.

In some embodiments of the present disclosure, to extend functions and working modes for the optical module, the number of the pins of the gold finger is required to be increased to transmit more control levels to enable different working modes. However, due to the limitations of standard requirements with the host, the number of pins of the gold finger cannot be increased physically. Thus, the present disclosure provides a solution for multiplexing pins of a gold finger.

FIG. 1 is a schematic diagram of a structure of an optical module according to some embodiments of the present disclosure. As shown in FIG. 1, the optical module includes an upper shell 11, a lower shell 12 and a circuit board 10. Electronic devices such as a resistor, a comparator and a power source are arranged on a surface of the circuit board

10. Optical subassemblies such as a transmitter optical subassembly 13 and a receiver optical subassembly 14 are on a first end of the circuit board 10, and a gold finger 15 including a plurality of pins is on a second end of the circuit board 10 opposite to the first end. To perform communication transmission between the optical module and the host, the gold finger of the optical module is inserted into the host so as to cause the pins of the gold finger to electrically contact the pins of the host. The plurality of pins in the gold finger 15 includes a multiplexing pin through which at least two types of signals/functions are transmitted. Accordingly, the host has a multiplexing pin corresponding to the multiplexing pin of the optical module, to perform communication transmission between the multiplexing pin in the optical module and the multiplexing pin in the host.

Figure 2A:
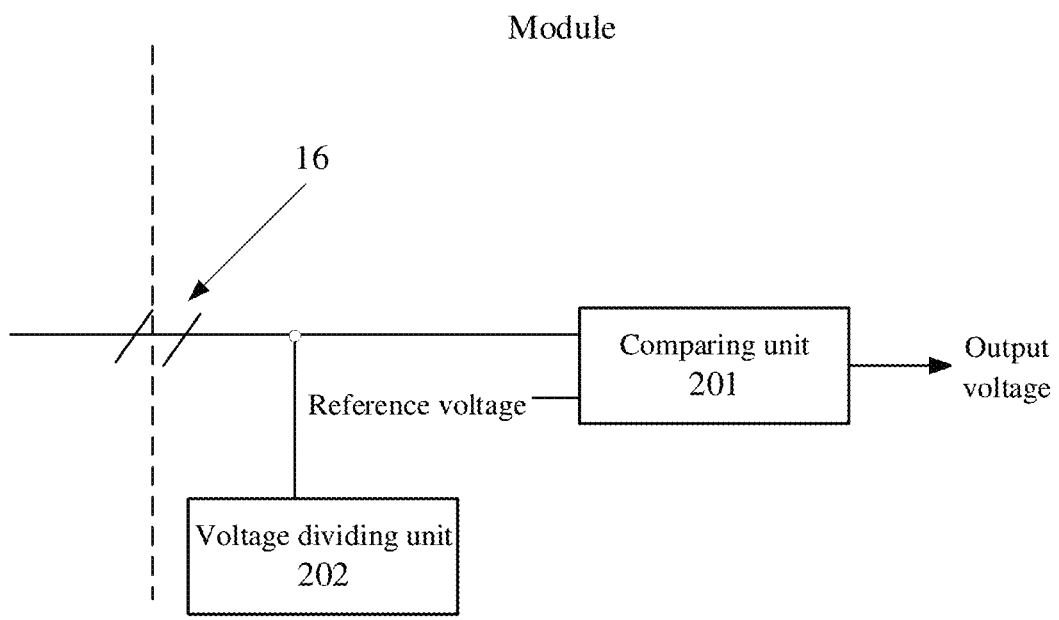
FIG. 2A is a schematic diagram of a circuit according to some embodiments of the present disclosure.

In some embodiments, as shown in FIG. 2A, the optical module in communication with the host includes a multiplexing pin 16, a comparing unit 201 and a voltage dividing unit 202. The comparing unit 201 includes a first input, a second input and a first output. The first input of the comparing unit 201 is connected with the multiplexing pin 16, and the second input of the comparing unit 201 is configured to receive a reference voltage for determination. The first output of the comparing unit 201 is configured to output a voltage. The voltage dividing unit 202 includes one input and one output, which are referred to as a third input and a second output respectively. The second output of the voltage dividing unit 202 is connected with the multiplexing pin 16 and configured to regulate a voltage at the multiplexing pin 16, so that the first input of the comparing unit 201 obtains a voltage regulated by the voltage dividing unit. According to a comparison result of an input voltage of the first input and the reference voltage of the second input, output voltages with different levels are obtained.

In these embodiments, output voltages are in different voltage intervals by setting a reference voltage for determination in the optical module and performing regulation with the voltage dividing unit, so that control voltages enabling different working modes respectively are output through the multiplexing pin. Without increasing the number of pins of the gold finger, the voltages transmitted on the multiplexing pin of the gold finger meet the needs of the optical module in different working modes, enhancing the functional modes of the optical module and improving performance of the optical module.

In some embodiments, the multiplexing pin 16 is configured to realize at least one of the following functions: determining whether the optical module is in a high power state or a low power state; and determining whether the optical module is in position; a Reset function for resetting the optical module; and a Fault function indicating a fault of the optical module. Further, the first pin is configured to realize at least one functional multiplex of: a functional multiplex with a function of determining whether the optical module is in a high power state or in a low power state and a function of determining whether the optical module is in position; and a functional multiplex with a Reset function and a Fault function.

In some embodiments, when the optical module is in communication with the host, the host sends an instruction signal to control the optical module to enter a Reset mode so that the optical module performs resetting in the Reset mode, thereby realizing the reset function. Specifically, a pin for controlling the Reset mode in the host is connected with a controlled pin of the gold finger of the optical module, and the host changes a voltage of the controlled pin of the gold finger of the optical module. When the host inputs an effective control voltage for reset which is a high-level voltage, the controlled pin of the gold finger of the optical module receives the high-level voltage for reset, so that the optical module enters the Reset mode to perform resetting.

Further, when the optical module is in communication with the host, if a fault is detected in the optical module, for example, it is detected that a laser is faulty and fails to emit light, or emits light irregularly, or always emits light that cannot be switched off, or MCU is faulty, or other chips are faulty and cannot work or the like, the optical module outputs a control voltage for indicating fault to the host, such that the host determines a corresponding procedure to handle the fault. The procedure includes disconnecting power source of the optical module, outputting a disable signal to the optical module or accessing the optical module through IIC and so on.

In the above embodiments, the Reset function and the Fault function of the optical module are implemented through the same physical pin which is a multiplexing pin. When the pin is multiplexed, different signals are transmitted in a time division manner through the multiplexing pin.

In some embodiments, the optical module has a Low Power (LP) mode. When the host does not need the optical module to perform photo-electric conversion to transmit information, the host instructs the optical module to enter the Low Power mode from a normal working state (i.e. a high power mode) so as to save energy. The optical module needs an instruction from the host to indicate whether to enter the Low Power mode or exit from the Low Power mode. Specifically, a control pin of the host for LP mode is connected with a controlled pin of the gold finger of the optical module, and the host changes a voltage at the controlled pin of the gold finger on the optical module based on the connection relationship. When the host increases its voltage output, the voltage at the controlled pin of the gold finger of the optical module will increase accordingly. The voltage comparing unit in the optical module determines whether to come into or exit from the Low Power mode by determining the voltage of the controlled pin.

Further, the host checks whether the optical module is connected. That is, the host checks whether the optical module is in position. There are two states after determining, by the host, whether the optical module is in position or not, that is, an in-position state and a non-in-position state. Specifically, during detection, a pin of the host for in-position detection is in a high-level state at default, that is, maintaining a high-level state when the optical module is not connected. Upon detecting a high level, the host determines that the optical module is not in position. When the optical module is connected, a pin of the optical module is connected with the pin of the host for in-position detection, pulling down the voltage of the pin of the host for in-position detection. Upon detecting a low voltage, the host determines that the optical module is in position. Specifically, the host determines the voltage of the pin for detection by the voltage comparing unit. The in-position detection and the Low Power mode determination of the optical module are both performed by detecting a voltage state of a pin. Further, a threshold voltage of the host for determination is higher than the reference voltage of the optical module for determination.

In the above embodiments, whether the optical module is in a Low Power mode and whether the optical module is in position are both determined by a same physical pin. The physical pin is a multiplexing pin. When the pin is multiplexed, different signals are transmitted in a time division manner through the multiplexing pin.

Figure 2B:
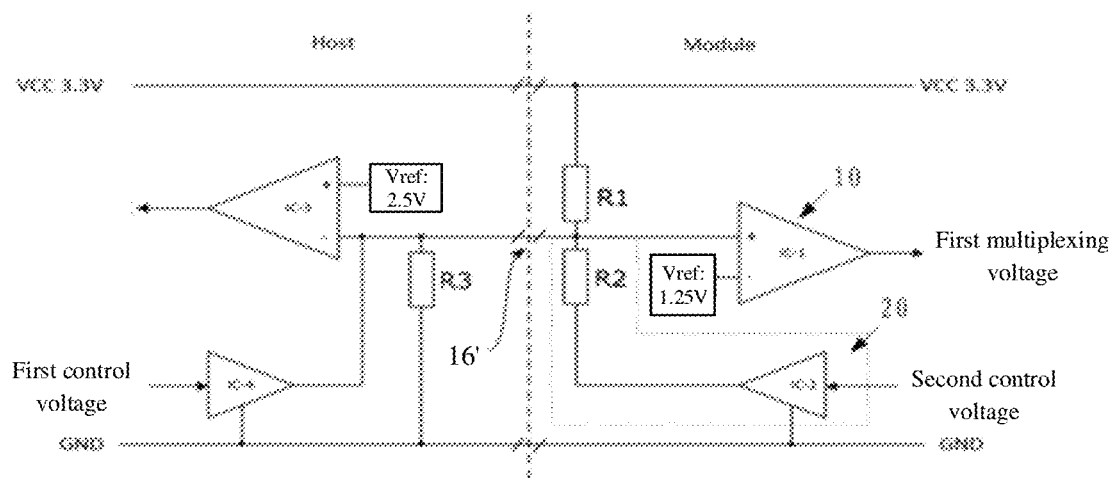
FIG. 2B is a schematic diagram of a circuit according to some embodiments of the present disclosure.
Figure 3A:
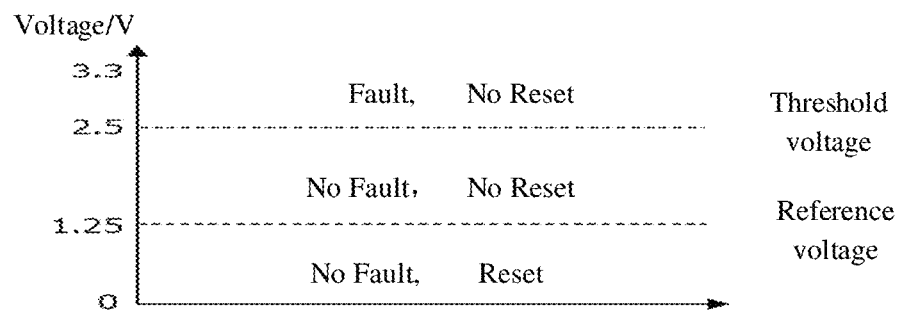
FIG. 3A is a schematic diagram of a level of a circuit according to some embodiments of the present disclosure.

In some embodiments, an optical module is provided. As shown in FIG. 2B, the optical module includes a comparing unit 10 and a voltage dividing unit 20. A first input of the comparing unit 10 is connected with a multiplexing pin 16' and receives a first control voltage output by a host through the multiplexing pin 16'. A second input of the comparing unit 10 is configured with a reference voltage. An output of the comparing unit 10 outputs a first multiplexing voltage for enabling a first mode. The first mode is a Reset mode and a second mode is a Fault mode. The threshold voltage is greater than the reference voltage, so that the working voltage of the multiplexing pin in the optical module is divided into three voltage intervals, and switches between these three voltage intervals accomplish different multiplexing modes of the optical module. FIG. 3A illustrates specific divided voltage intervals, according to various embodiments. The working modes and the switching process in each voltage interval is described in detail below.

Specifically, the first input of the comparing unit 10 is connected with the multiplexing pin 16' and receives the first control voltage output by the host through the multiplexing pin 16'. The comparing unit 10 outputs a first multiplexing voltage according to a comparison between the first control voltage and the reference voltage. The first input of the comparing unit 10 is a positive end, and the second input of the comparing unit 10 is a negative end. When the received first control voltage is less than the reference voltage, the output of the comparing unit 10 outputs the first multiplexing voltage which is low-level and enables the first mode, thereby realizing the Reset mode of the optical module.

In some embodiments, as shown in FIG. 2B, the optical module includes the comparing unit 10 and the voltage dividing unit 20. The comparing unit 10 is a comparator IC-1, whose first input (a positive end) is connected with the host through the multiplexing pin 16' of the optical module, and whose second input (a negative end) is configured with a reference voltage 1.25V.

The host includes a second buffer (a buffer IC-4), a comparator IC-3 and a third resistor (a resistor R3 with a resistance value 68K). When the host controls the optical module to enter the Reset mode, the host outputs the first control voltage with low level through the buffer IC-4 and the multiplexing pin 16', a first input of the comparator IC-1 receives the first control voltage through the multiplexing pin, where the first control voltage is less than the configured reference voltage, and an output of the comparator IC-1 outputs first multiplexing voltage which is low-level and enables the first multiplexing mode. Thus, the Reset mode of the optical module is achieved. When the host does not need to control the optical module to enter the Reset mode, the host outputs a high-level control voltage through the buffer IC-4 and the multiplexing pin 16', and transmit the high-level control voltage to the first input of the comparator IC-1 through the multiplexing pin 16', where the high-level control voltage is greater than the configured reference voltage, and the output of the comparator IC-1 outputs a first multiplexing voltage. The first multiplexing voltage is of a high level and disables the first multiplexing mode. In this way, the optical module receives the first control voltage output by the host through the multiplexing pin, and the comparing unit in the optical module controls and outputs the first multiplexing voltage for enabling the first mode according to the comparison of the first control voltage and the reference voltage, so as to control the enabled or disabled state of the first mode.

The input of the voltage dividing unit 20 is configured to receive a second control voltage, and the output of the voltage dividing unit 20 is connected with the multiplexing pin 16'. When the second control voltage is of a first level, the output of the voltage dividing unit 20 outputs a second multiplexing voltage. When the second control voltage is of a second level, the output of the voltage dividing unit 20 outputs a third multiplexing voltage for disabling. The second multiplexing voltage is greater than the threshold voltage configured on the host. The second multiplexing voltage is used for enabling the second mode. The third multiplexing voltage is less than the threshold voltage, and the threshold voltage is greater than the reference voltage.

As shown in FIG. 2B, the voltage dividing unit 20 includes a first buffer (a buffer IC-2) and a second resistor (a resistor R2). An input of the first buffer (the buffer IC-2) receives the second control voltage which is a control signal for indicating fault in the optical module, later being reported to the host. When there is a fault in the optical module, the second control voltage is of a high level, and when there is no fault in the optical module, the second control voltage is of a low level. A first output of the first buffer (the buffer IC-2) is connected with the second resistor (the resistor R2), and a second output of the first buffer (the buffer IC-2) is grounded. A resistance value of the second resistor (the resistor R2) is 8K. One end of the second resistor (the resistor R2) is connected with the first output of the first buffer (the buffer IC-2), and the other end of the second resistor is connected with the multiplexing pin 16'. As shown in FIG. 2B, the optical module includes a first resistor (a resistor R1), whose first end is connected with a power source VCC (the power source VCC is 3.3V) and whose second end is connected with the multiplexing pin 16'. A resistance value of the first resistor (the resistor R1) is 5K.

Specifically, when the optical module works normally, the first buffer (the buffer IC-2) receives the second control voltage, where the second control voltage is of the second level, for example, the second level is a low level. In this case, the voltage output of the voltage dividing unit 20 is a component voltage value corresponding to a parallel resistor (the resistance value of the parallel resistor of R2 and R3 is 68K*8K/(68K+8K)=7.16 KΩ) composed of the second resistor (the resistor R2) and the third resistor (the resistor R3) after the power source VCC goes through the first resistor (the resistor R1) and the parallel resistor. That is, when the second control voltage is of the second level, the third multiplexing voltage for disabling at the multiplexing pin 16' is 7.16K*3.3V/(7.16K+5k)=1.94V, where the third multiplexing voltage is less than the threshold voltage configured on the positive end of the comparator (IC-3) in the host and the threshold voltage is 2.5V. The output of the comparator IC-3 outputs a high level, so that the host determines that no fault occurs to the optical module, that is, the optical module determines that the optical module is normal and does not enter the Fault mode, based on the high level output by the output of the comparator IC-3.

When the optical module works abnormally, the optical module needs to report error to the host to notify the host that there is a error in the optical module. The first buffer (the buffer IC-2) receives the second control voltage, which is a high level. When the first buffer (the buffer IC-2) receives the high level control voltage, the first buffer (the buffer IC-2) is in a high impedance state with its first output being in a floating state. Accordingly, one end of the second resistor (the resistor R2) connected with the first output of the first buffer (the buffer IC-2) is also floated. Thus, the voltage over the multiplexing pin 16' is a component voltage of the first resistor (the resistor R1) and the third resistor (the resistor R3). That is, when the optical module works normally, i.e. when the second control voltage is of the second level (the low level), the voltage dividing unit 20 obtains the second multiplexing voltage by pulling up the voltage of the multiplexing pin 16', where the second multiplexing voltage is, for example, 68K*3.3V/(68K+5K)=3.07V that is greater than the threshold voltage 2.5V configured on the positive end of the comparator IC-3 in the host, and the second multiplexing voltage enables the second mode (the Fault mode). The output of the comparator IC-3 outputs a low level so that the host determines that there is a fault in the optical module based on the low level output by the output of the comparator IC-3, that is, the optical module enters the Fault mode. Here, the second voltage (3.07V) is greater than the reference voltage, and the optical module will not enter the first mode. Thus, when the second control voltages of different levels are received through the receiving end of the voltage dividing unit 20, the voltages transmitted to the host through the multiplexing pin are regulated. When the optical module works abnormally, the voltage dividing unit 20 pulls up the voltage to be greater than the threshold voltage configured on the host, so as to enable the second multiplexing mode, i.e., the Fault mode, of the optical module.

The optical module according to the embodiments of the present disclosure controls the voltages output by the multiplexing pin. The voltages at the multiplexing pin are divided into different voltage intervals by setting the threshold voltage and the reference voltage and performing regulation with the comparing unit and the voltage dividing unit, so that control voltages for enabling different working modes respectively be output through the multiplexing pin. Without increasing the number of pins of the gold finger, control levels at the pin of the gold finger meet the needs of the optical module in different working modes, enhancing the functional modes of the optical module and improving performance of the optical module.

Figure 2C:
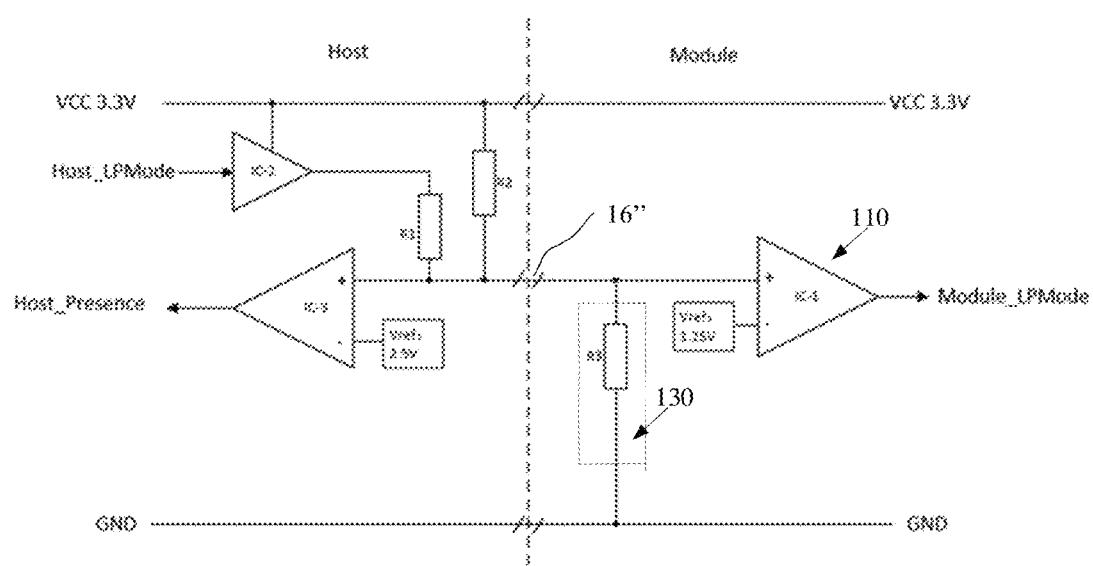
FIG. 2C is a schematic diagram of a circuit according to some embodiments of the present disclosure.

In another implementation, an optical module is provided. As shown in FIG. 2C, the optical module includes a comparing unit 110 and a voltage dividing unit 130. A first input of the comparing unit 110 is connected with a multiplexing pin 16" which receives a first voltage and a second voltage from a host in a time division manner. The voltage dividing unit 130 is connected with the multiplexing pin 16" to lower the voltage of the host, so that the host outputs the first voltage less than a threshold voltage of the host. A second input of the comparing unit 110 is configured with a reference voltage. An output of the comparing unit 110 outputs a control voltage, where the reference voltage is greater than the second voltage and less than the first voltage.

The host determines whether the optical module is in position (whether the optical module is inserted into the host). The determination of the host is performed by determining a voltage of a specific pin. A pin of a host is connected with a multiplexing pin of a gold finger of the optical module, and the pin of the host is in a high voltage state at default. After the optical module is inserted, the multiplexing pin of the gold finger of the optical module is connected with the voltage dividing unit in the optical module to lower the voltage of the pin of the host. After the voltage is pulled down, the pin of the host outputs the first voltage to the multiplexing pin of the optical module, that is, where the first voltage is a lower voltage from the high voltage at the pin of the host. Specifically, the threshold voltage of determining, by the host, whether the optical module is in position is 2.5V and a default voltage of the host is greater than 2.5V, the host determines that the optical module is not in position. After the optical module is inserted into the host, the voltage dividing unit in the optical module pulls down the voltage of the multiplexing pin below 2.5V, that is, the first voltage is obtained. The optical module is inserted into the host, the multiplexing pin is electrically connected with a corresponding pin of the host, and the voltage dividing unit of the optical module pulls down the voltage of the pin of the host which corresponds to the multiplexing pin, so that the host determines that the optical module is in position. As a result, transmission of the signal is in-position is determined. When instructing the optical module to enter the Low Power mode, the host sends an instruction signal to the optical module, and the instruction signal is transmitted by the multiplexing pin.

When instructing the optical module to enter the Low Power mode, the host will send an instruction signal to the optical module, and this instruction signal is transmitted by the multiplexing pin. The multiplexing pin transmits multiple signals, because the voltages for performing in-position determination and low power state determination of the optical module by the host are different and the low power state is a further state after the optical module is in position. Specifically, the threshold voltage for performing in-position determination by the host is 2.5V, and the reference voltage for performing low power state determination for the optical module is 1.25V. The host defaults to output a voltage greater than 2.5V until the voltage is pulled down after the optical module is inserted into the host. However, the first voltage is still greater than reference voltage for low power state determination of the optical module and the optical module is in in-position and high-power states. The host further changes the voltage to a second voltage which is less than the reference voltage for low power determination of the optical module, where the optical module is in-position and in a low-power state. In this way, the voltage is pulled down by the optical module on the same pin to a first point to help the optical module enter the in-position and high-power state; the voltage is further pulled down to a second point to make the optical module enter the in-position and low-power state.

In FIG. 2C, the comparing unit 110 in the optical module is a comparator, the voltage dividing unit 130 is a resistor R3, and one end of which is connected with the multiplexing pin, the other end of which is grounded. The optical module provided in the embodiments of the present disclosure includes the comparing unit 110 (the comparator IC-1) and the voltage dividing unit 130 (the resistor R3). The first input/the positive input of the comparator IC-1 is connected with the multiplexing pin, thereby connecting with the host through the multiplexing pin on the optical module. In FIG. 2C, the multiplexing pin of the optical module is connected with the pin of the host to form an electrical pathway 16.

The host connected with the optical module includes a buffer IC-2, a comparator IC-3, a resistor R1 and a resistor R2. The positive input of the comparator IC-3 is connected with the first input/the positive input of the comparator IC-1 of the optical module through the multiplexing pin on the optical module. The negative input of the comparator IC-3 is configured with the threshold voltage, and the negative input of the comparator IC-1 is configured with the reference voltage. The threshold voltage is used to determine whether the optical module is inserted into the host, and the reference voltage is used to determine whether the optical module enters the Low Power mode.

In the optical module, one end of the resistor R3 is connected with the multiplexing pin, and the other end of the resistor R3 is grounded.

In the host, one end of the resistor R1 is connected with the positive input of the comparator IC-3, and the other end of the resistor R1 is connected with the output of the buffer IC-2. One end of the resistor R2 is connected with the power source, and the other end of the resistor R2 is connected with the positive input of the comparator IC-3.

In some embodiments, first voltage is for indicating Presence, and the second voltage is for indicating LPMode. The host transmits the second voltage for indicating LPMode to the optical module under the control signal Host_LPMode received by the buffer IC-2, and the optical module outputs a control voltage Module_LPMode based on the control voltage LPMode.

When the optical module disconnects with the host, the voltage at the positive input of the comparator IC-3 is higher than the threshold voltage resulting in a high-level output signal of IC-3 Host_Presence, indicating the optical module is not in position.

When the optical module is in connection with the host, the positive input of the comparator IC-3 receives the first voltage for indicating Presence. The voltage at the positive input of the IC-3 is less than the threshold voltage, resulting in a low level output signal of IC-3 Host_Presence, indicating that the optical module is in position for the host.

On one hand, when the Host_LPMode is of a low level, the voltage at the positive input of the comparator IC-1 is less than the reference voltage, resulting in a low level output signal of IC-1 Module_LPMode, and the optical module is controlled to work in low power; and on the other hand, the voltage at the positive input of the comparator IC-3 is less than the threshold voltage, resulting a low level output signal of IC-3 Host_Presence, indicating the optical module is in position.

When the Host_LPMode is of a high level, the IC-2 outputs a high level. On one hand, the voltage at the positive input of the IC-1 is higher than the reference voltage, resulting a high level Module_LPMode, and the optical module is controlled to work in high power. On the other hand, the voltage at the positive input of the IC-3 is less than the threshold voltage, resulting in a low level Host_Presence, indicating that the optical module is in position.

Figure 3B:
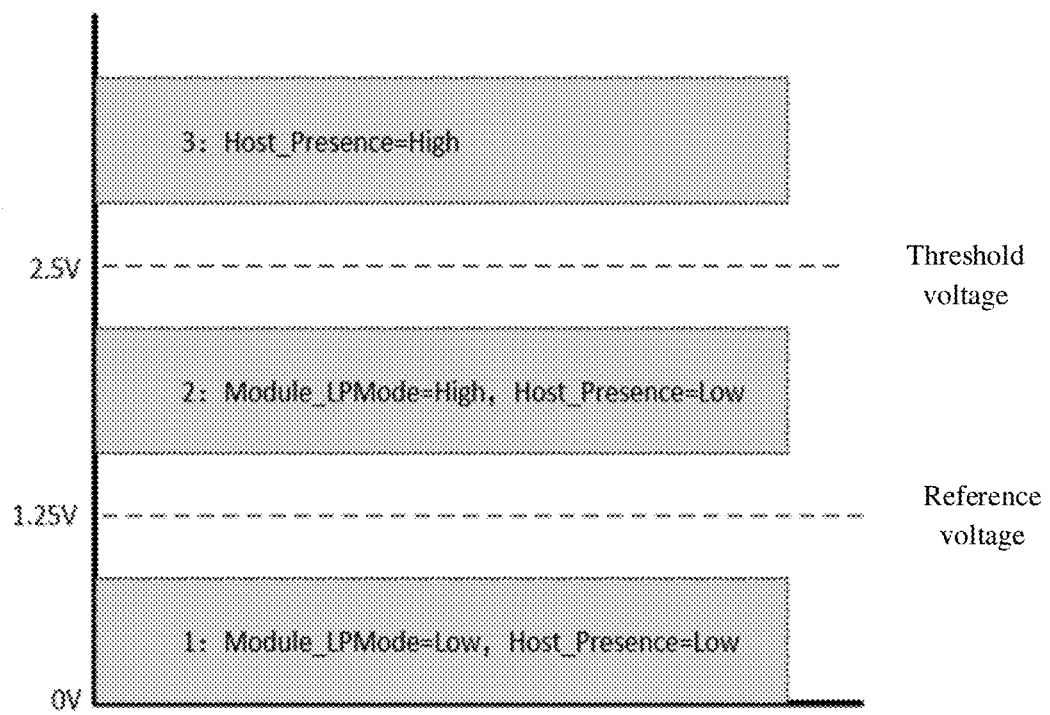
FIG. 3B is a schematic diagram of a level of a circuit according to some embodiments of the present disclosure.

FIG. 3B is a schematic diagram of levels in the scenario shown in FIG. 2C. In FIG. 3B, the voltage of the multiplexing pin is in the first interval from 0V to 1.25V, that is, below the reference voltage (1.25V), and the Module_LPMode is of a low level and the Host_Presence is of a low level, indicating that the optical module is in position and works in low power.

The voltage of the multiplexing pin is in the second interval from 1.25V to 2.5V, the Module_LPMode is of a high level and the Host_Presence is of a low level, indicating that the optical module is in position and works in low power.

The voltage of the multiplexing pin is in the third interval above the threshold voltage (2.5V), and the Host_Presence is of a high level, indicating that the optical module is not in position. In some embodiments, although it is theoretically considered that the optical module is in position when a voltage is less than 2.5V, the voltage actually is lower than 2.5V, and thus the second interval shown in FIG. 3B is located in a middle region less than the region between 1.25V and 2.5V, in order to maintain high sensitivity for the voltage determination.

Specifically, the resistance of resistor R1 is 15 KΩ, the resistance of resistor R2 is 25KΩ and the resistance of resistor R3 is 10 KΩ.

When the optical module is not in position, the optical module shown in FIG. 2C is invisible. In this case, the voltage of the signal multiplexing pin will be pulled up by the resistor R2 to the power source (3.3V), and the positive input of the comparator IC-3 is 3.3V and the negative input of the comparator IC-3 is the threshold voltage (2.5V). Thus, the signal Host_Presence is high-level.

When the optical module works in low power, the signal Host_LPMode is of a low level and the low level is input to the IC-2. In this case, the voltage of the multiplexing pin is 10K*3.3V/(10K+25K)=0.94V after being divided by the resistors R3 and R2. Therefore, the positive input of the IC-3 is 0.94V, and the negative input of the IC-3 is the threshold voltage (2.5V), the signal Host_Presence is of a low level. At the same time, the positive input of the comparator IC-1 is 0.94V, and the negative input of the comparator IC-1 is the reference voltage (1.25V), therefore, the signal Module_LPMode is of a low level.

When the optical module works in high power, the signal Host_LPMode is of a high level and the high level is input to the IC-2. In this scenario, a parallel resistance value of the resistor R1 and the resistor R2 is 25K*15K/(25K+15K)=9.375 KΩ and the voltage of the multiplexing pin is 10K*3.3V/(10K+9.375K)=1.7V. In this case, the positive input of the comparator IC-3 is 1.7V, and the negative input of the comparator IC-3 is the threshold voltage (2.5V), therefore, the signal Host_Presence is of a low level. Meanwhile, the positive input of the comparator IC-1 is 1.7V, and the negative input of the comparator IC-1 is the reference voltage (1.25V), therefore, the signal Module_LPMode is of a high level.

In conclusion, the optical modules according to the embodiments of the present disclosure allow voltage regulations on the multiplexing pin. The voltage dividing unit obtains the first voltage less than the threshold voltage of the host by lowering the voltage of the multiplexing pin. As a result, a first signal is transmitted between the optical module and the host. The optical module receives the second voltage from the host and the reference voltage of the comparing unit is greater than the second voltage and less than the first voltage. As a result, a second signal is transmitted between the host and the optical module.

In the description of the present disclosure, one of ordinary skill in the art would understand that terms "a first" and "a second" are used only for descriptions and shall not be understood as indicating or implying relative importance or implying a number of the indicated technical features. Thus, elements limited by "a first" and "a second" may explicitly or implicitly include one or more features. In the descriptions of the present disclosure, "a plurality" refers to two or more unless otherwise stated clearly.

In the descriptions of the present specification, terms such as "an example", "some examples", "exemplary embodiments", "embodiments", "a specific embodiment" or "some embodiments" are intended to refer to that a specific feature, structure, material, or characteristic described in combination with an embodiment or an example are included in at least one embodiment or example of the present disclosure. In the present specification, the illustrative expressions of the above terms do not necessarily refer to a same embodiment or example. Further, specific feature, structure, material or characteristic described above may be combined in a proper way in one or more embodiments or examples.

The foregoing disclosure is merely some illustrative examples of the present disclosure but not intended to limit the present disclosure, and any modifications, equivalent substitutions, adaptations thereof made within the spirit and principles of the disclosure shall fall within the scope of the present disclosure.

The invention claimed is:

1. An optical module, comprising:
   a gold finger, comprising a plurality of pins, a first pin of the plurality of pins is capable of being multiplexed;
   a comparing unit, comprising a first input, a second input and a first output, wherein the first input is connected with the first pin, the second input is configured to receive a reference voltage, and the first output is configured to output an output voltage; and
   a voltage dividing unit, comprising a third input and a second output, wherein the third input is configured to receive a voltage input, the second output is connected with the first pin and configured to regulate a voltage at the first pin, so that the first input of the comparing unit receives a regulated voltage;
   wherein voltages of different levels are output by the comparing unit based on a comparison result between an input voltage of the first input of the comparing unit and the reference voltage of the second input.

2. The optical module according to claim 1, wherein the first pin is configured to realize at least one function of:
   determining whether the optical module is in a high power state or a low power state; and
   determining whether the optical module is in position; a Reset function for resetting the optical module; and a Fault function indicating a fault on the optical modul.

3. The optical module according to claim 1, wherein
   the first input of the comparing unit is configured to receive a first control voltage output by a host through the first pin,
   the first output of the comparing unit is configured to output a first voltage for enabling a first mode,
   the third input of the voltage dividing unit is configured to receive a second control voltage;
   the second output of the voltage dividing unit is configured to output a second voltage if the second control voltage input received by the third input is of a first level, and to output a third voltage for disabling the first mode if the second control voltage input received by the third input is of a second level;
   the second voltage is used for enabling a second mode if the second control voltage input is greater than a threshold voltage on the host, the third voltage is less than the threshold voltage, and the threshold voltage is greater than the reference voltage.

4. The optical module according to claim 1, wherein
   the first input of the comparing unit is configured to receive a first control voltage output by a host through the first pin, and the second input of the comparing unit is configured with the reference voltage, wherein the first output of the comparing unit is configured to output a first voltage to enable a first mode if the first control voltage received by the first input is less than the reference voltage; and
   the third input of the voltage dividing unit is configured to receive the second control voltage, and the second output of the voltage dividing unit is configured to output a second voltage to enable a second mode if the third input of the voltage dividing unit receives the second control voltage and a voltage at the first pin is pulled up,
   wherein the second voltage is greater than the threshold voltage on the host and the threshold voltage is greater than the reference voltage.

5. The optical module according to claim 1, wherein,
   the first pin is configured to receive a first voltage and a second voltage from a host in a time division manner, wherein the first voltage is obtained by lowering a voltage of the host by the voltage dividing unit, and is lower than the threshold voltage of the host, and the reference voltage is greater than the second voltage and less than the first voltage.

6. The optical module according to claim 5, wherein the threshold voltage is used to determine whether the optical module is inserted into the host.

7. The optical module according to claim 5, wherein the reference voltage is used to determine whether the optical module enters a Low Power mode.

8. The optical module according to claim 1, wherein the comparing unit is a comparator, the first input of the comparing unit is a positive end, and the second input of the comparing unit is a negative end.

9. The optical module according to claim 8, wherein the output of the comparing unit is configured to output the first voltage for enabling the first mode if the first control voltage on the positive end is less than the reference voltage on the negative end.

10. The optical module according to claim 3, further comprising a first resistor, a first end of the first resistor is connected with the first pin, and a second end of the first resistor is connected with a power source.

11. The optical module according to claim 3, wherein the voltage dividing unit comprises a second resistor and a first buffer, a first end of the second resistor is connected with the first buffer, a second end is connected with the first pin, one end of the first buffer is grounded, and the first buffer is configured to be in a high impedance state if the second control voltage is of the second level.

12. The optical module according to claim 3, wherein the first mode is a Reset mode and the second mode is a Fault mode.

* * * * *